United States Patent [19]

Zinnai

[11] 4,272,054

[45] Jun. 9, 1981

[54] FIRE-SAFE SEALING DEVICE FOR VALVE

[75] Inventor: Sadazi Zinnai, Yokohama, Japan

[73] Assignee: Tokyo Koso K.K., Japan

[21] Appl. No.: 116,216

[22] Filed: Jan. 28, 1980

[30] Foreign Application Priority Data

Jan. 31, 1979 [JP] Japan ................................... 54-9164

[51] Int. Cl.³ .............................................. F16K 3/10
[52] U.S. Cl. ..................................... 251/173; 137/74;
251/306
[58] Field of Search ............... 251/173, 174, 306, 307;
137/74

[56] References Cited

U.S. PATENT DOCUMENTS

| 3,734,457 | 5/1973 | Roos | 251/306 X |
| 4,202,365 | 5/1980 | Aoki | 251/173 X |
| 4,220,172 | 9/1980 | Stager | 251/173 X |

*Primary Examiner*—Alan Cohan
*Attorney, Agent, or Firm*—Stevens, Davis, Miller & Mosher

[57] ABSTRACT

A fire-safe sealing device for a valve including a valve body defining a fluid passage and an inner valve positioned in said fluid passage to open or close the fluid flow therethrough. The device comprises an annular groove formed around the fluid passage, a seat packing made of synthetic resin mounted in said annular groove, and a metallic annular elastic member arranged to contact with one side of said seat packing and the seating surface of the inner valve. The metallic elastic member acts to promote the sealing action of the seat packing and also acts to hold the leakage of the fluid to the minimum when the seat packing has been lost by a fire.

1 Claim, 6 Drawing Figures

FIRE-SAFE SEALING DEVICE FOR VALVE

BACKGROUND OF THE INVENTION

The present invention relates to a sealing device for a valve. The sealing device has two functions, which are, first in the normal state (e.g. no fire present), it completely shuts off or allows the passage of a fluid through the piping by means of a seat packing made of synthetic resinous material which has perfect and easy fluid stopping property and second, in the abnormal state where the seat packing has been broken owing to a fire, to hold the leakage of the fluid to the minimum by means of a fire-safe metal-to-metal contact seal, thereby preventing the spreading of the fire.

SUMMARY OF THE INVENTION

It is an object of the present invention to provide a sealing device for a self-adjustable valve with elastic seat packing, which, in the normal state, can completely shut off fluid flow independent of the direction of the fluid passing through the valve, and which is superior in durability by holding its initial performance for a long period.

It is another object of the present invention to provide a sealing device for a self-adjustable valve of with elastic seat packing can completely shut off the flow of fluid, even high pressure fluids, by utilizing the fluid pressure produced where the flow has been shut off.

It is a further object of the present invention to provide a sealing device for a valve with elastic seat packing, in which seat packing, made of a synthetic resin, having no mechanical elasticity, and a metallic elastic member are combined to provide properties of mechanical elasticity and elastic restoring force to the sealing device.

It is a further object of the present invention to provide a fire-safe sealing device which provides satisfactory fluid shut-off performance and holds the fluid leakage downstream to a minimum amount (for example, when the seat packing has been lost due to fire, an amount less than JPI-7S-48-74 according to JAPAN PETROLEUM INSTITUTE STANDARD) by using the fluid pressure against the thin metallic elastic member to provide metal-to-metal contact. Thereby preventing the spread of the fire.

In accordance with the present invention there is provided a fire-safe sealing device for a valve including a valve body defining a fluid passage and an inner valve positioned in said fluid passage to open or close the fluid flow, therethrough. The fire-safe sealing device comprises an annular groove nearly T-shape in cross-section, formed around the periphery of the valve body, a retainer for the seat packing set in the groove; a seat packing of synthetic resin mounted in said annular groove and an annular elastic member made of sheet metal. The seat packing comprises a portion projecting from the groove into the fluid passage, shoulders formed at the sides of said projecting part to prevent the seat packing from wholly projecting into the fluid passage and an inclined annular surface (i.e. bottom surface) at the side opposite to the fluid passage. The metallic annular elastic member is arranged to make tight contact with one side and the bottom surfaces of the seat packing and having an elastic portion of nearly V-shape extending beyond the portion contacting with the bottom surface of the seat packing and a contact portion of nearly semi-circular shape in section extending toward the fluid passage side, whereby the part of the seat packing projecting toward the fluid passage is tightly held in contact with the inner valve to perfectly shut off the fluid flow by the action of elasticity of the annular metallic elastic member together with the action of the fluid pressure acting through the elastic member to the seat packing in the normal state. Also the annular metallic elastic member acts to shut off the flow of fluid when the seat packing made of synthetic resin has been completely broken by fire, thereby holding the leakage of fluid downstream to a minimum and preventing the spread of fire.

BRIEF DESCRIPTION OF THE DRAWINGS

The drawings illustrate a preferred embodiment of the present invention, in which:

FIG. 1 is a sectional view of a portion of the sealing-device with the inner valve open.

PREFERRED EMBODIMENT

Figure 1:
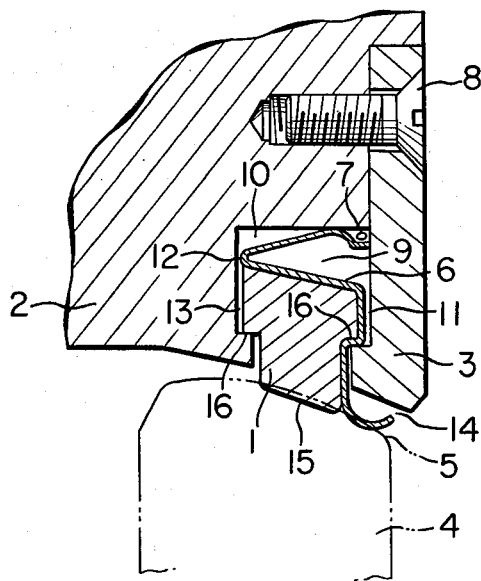
FIG. 1 shows an example of the fire-safe sealing device for a valve according to the present invention.

Now the fire-safe sealing device for valve according to the present invention will be explained with reference to FIGS. 1–6 which illustrate the preferred embodiment of the invention.

In FIGS. 1–6, 1 is the seat packing, 2 is the valve body, 3 is the retainer for the seat packing, 4 is the inner valve for shutting off the fluid flow, 5 is an inclined seating surface which is arranged to contact with the seat packing 1 to completely stop the passage of fluid, 6 is an elastic member made of thin sheet metal (hereinafter referred to as "metallic elastic member") which functions as a fire-safe sealing member in forming metal-to-metal contact in the abnormal state where the seat packing 1 made of synthetic resin has been broken by fire; the metallic elastic member also functions as a sealing member to provide elastic properties which are used to prevent the seat packing 1 from permanently deforming at the time of shutting off the passage of fluid under normal state, 7 is an O-ring made of synthetic rubber for sealing the gap between the valve body 2 and the metallic elastic member 6, 8 is a screw for fixing the seat packing retainer 3 onto the valve body 2, 9 is a fluid pressure introducing A chamber defined by the metallic elastic member 6 and the seat packing retainer 3, 10 is a fluid pressure introducing B chamber defined by the metallic elastic member 6 and the valve body 2, 11 is the clearance between the metallic elastic member 6 and the seat packing retainer 3, 12 is the clearance between the metallic elastic member 6 and the valve body 2, 13 is the clearance between the seat packing 1 and the valve body 2, and 14 is the clearance between the metallic elastic member 6 and the seat packing retainer 3.

The seat packing 1 will be explained in detail. First the description will be given to the case where a groove having nearly T-shape in section is formed in the valve body at right angle to the fluid passage and seat packing is mounted therein. The seat packing 1 has an inclined surface 15 for contacting with the inner valve 4, shoulders 16 formed at the sides of said inclined surface prevent the projection of the seat packing into the fluid passage and an inclined surface at the side opposite to the fluid passage (i.e. bottom surface) which is so formed so that the metallic elastic member 6 may effectively apply back-up force to the inclined contact surface 15 of the seat packing 1. In this regard it is to be noted that in case of low fluid pressure the satisfactory sealing effect can be obtained without such inclined surface.

Second, referring to the case where the groove having nearly T-shape in section is formed in the inclined seating surface 5 of the inner valve 4 at right angle thereto and the seat packing 1 is mounted therein, it is, of course, not necessary to form inclined surfaces on the seat packing 1 at the contact area 15 with the inner valve 4 and the bottom area thereof.

The seat packing 1 is preferably made of synthetic resin such as ethylene tetrafluoride which is superior in wear-resistant and fluid shut-off properties.

Although the clearance 13 is formed as a fluid passage leading into the fluid introducing B chamber in the embodiment as shown in FIG. 1, a plurality of V-shaped recesses may be formed, instead of such clearance, in the annular side surface of the seat packing 1, to achieve the same effect.

Figure 5:
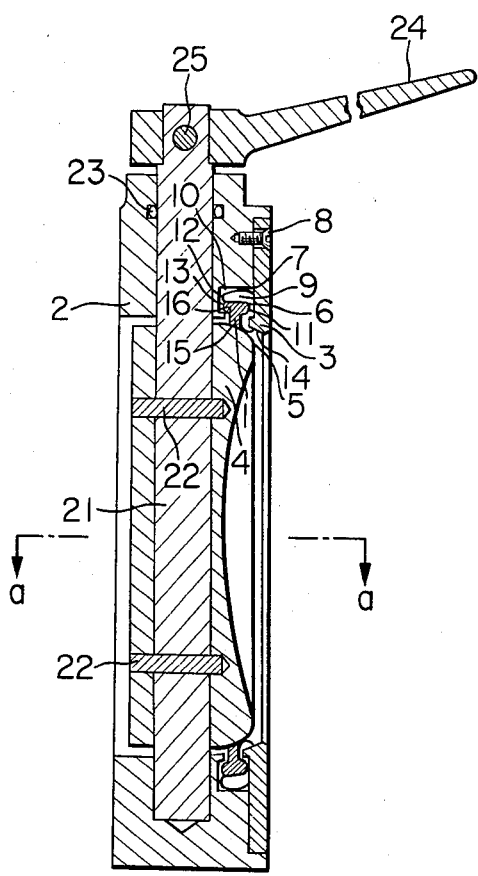
FIG. 5 is a longitudinal sectional view of a butterfly valve in which the fire-safe sealing device according to the present invention is applied.
Figure 6:
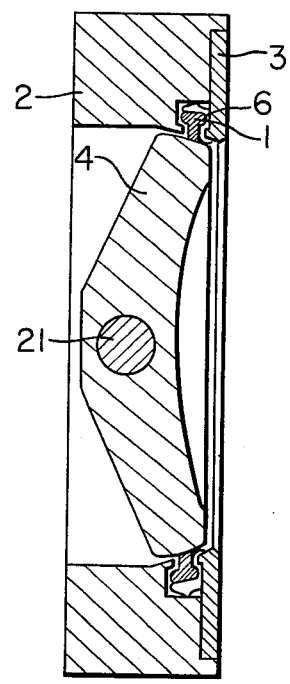
FIG. 6 is a sectional view of the butterfly valve taken along a line a—a in FIG. 5.

In FIGS. 5-6, 21 is a valve stem which is inserted into a through-hole formed in the inner valve 4 and is supported in the hole formed in the valve body 2 and projects at one end outward of the valve body 2, 22 is a pin for fixing the valve stem 21 and the inner valve 4 together, 23 is a sealing ring for preventing the fluid from leaking outward of the valve body 2, 24 is a lever-handle for manually rotating the inner valve 4 to open or close the fluid passage or to adjust the fluid passage to a desired degree, and 25 is a pin for fixing the valve stem 21 and the lever-handle 24 together.

Although the fire-safe sealing device for valve according to the present invention has been described in the above embodiment as the one which is arranged in the valve body 2, it may be arranged in the inner valve 4, with the same performance, and furthermore the present invention is not limited to the forms as described above but can be applied in various forms.

The valve body 2 is, of course, fixedly mounted between the pipe flanges (shown in the drawings).

The operation of the fire-safe sealing device for valve according to the present invention will be explained in detail, with reference to FIGS. 1-4.

Firstly the operation in normal state will be explained.

It is assumed that the sealing device is mounted as shown in FIG. 1 and the inner valve 4 for shutting off the fluid passage is operated manually or automatically by pneumatic, hydraulic, electrical or some other automatic actuator, to the fluid shut-off position, where the inclined seating surface 5 of the inner valve 4 comes into contact with the contact portion 15 of the seat packing 1. Under such action, the seat packing 1 is pressed in the direction away from the fluid passage, while the metallic elastic member 6 is compressed to increase the reacting force, so that the contact pressure acting between the inclined seating surface 5 of the inner valve 4 and the contact portion 15 of the seat packing 1 relative to the inner valve 4 is increased to effectively shut off the fluid. In the state where the inner valve 4 opens the fluid passage, that is, the inclined seating surface 5 is moved away from the contact surface 15 of the seat packing 1, the seat packing 1 is returned to the state as shown in FIG. 1 by the action of the metallic elastic member 6.

Figure 2:
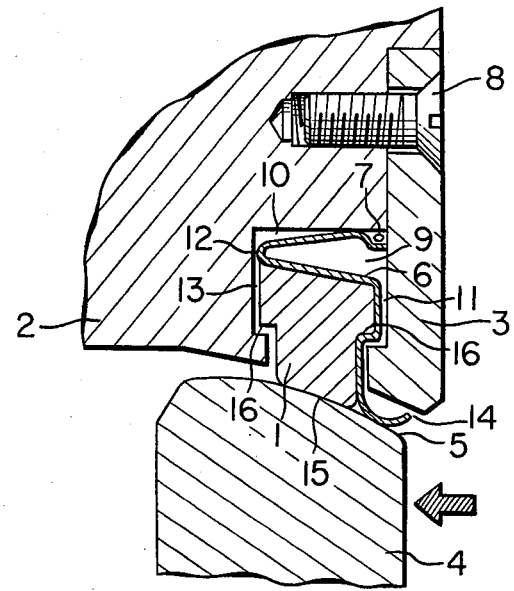
FIG. 2 is a sectional view of a portion of the sealing-device in which the inner valve for shutting off the fluid passage acts against the sealing device to stop the flow of fluid.

The fire-safe sealing device according to the present invention, in addition to the action as described above, serves to utilize the fluid pressure to hold the proper contact surface pressure depending upon the fluid pressure, so that it provides perfect and stable shut-off action of fluid throughout the range of low pressure to high pressure fluids. Referring to FIG. 2, in which the fluid passes in the direction as shown by the arrow and the inner valve 4 is closed to shut off the fluid passage, the fluid pressure passes through the clearances 14 and 11 into the fluid pressure introducing A chamber 9. Where it acts against the metallic elastic member 6, so that the difference between this pressure and the force of the fluid pressure acting on the contact portion 15 of the seat packing 1 relative to the inner valve 4 serves to press the contact portion 15 of the seat packing 1 against the inclined seating surface 5 of the inner valve 4, thereby providing perfect fluid shut-off.

Therefore the present invention provides a fire-safe sealing device in which it is not necessary to make the initial pressing force of valve seat contact surface to be proportional to the fluid pressure as in conventional valve. It is now possible to hold the initial pressing force of valve seat contact surface constant, so that the operating force required to open or close the valve is reduced and the initial performance can be maintained for a long period.

The first-safe sealing device according to the present invention has a characteristic feature in that the same performance can be obtained even if the flowing direction of fluid is reversed from that shown by the arrow in FIG. 2.

Referring to FIG. 2, the description will be given to the case where the fluid is passed in the opposite direction to that shown by the arrow. In the state where the fluid passage is stopped by the inner valve 4, the fluid passes through the clearances 13 and 12 into the fluid pressure introducing B chamber 10, so that the force is produced to press the seat packing against the inclined seating surface 5 under the same action as described above, while the metallic elastic member 6 acts to completely shut off the fluid by the elastic force thereof.

Next the description will be given to the fire-safe sealing function, which is produced when the seat packing 1 has been broken or burned out owing to a fire.

Figure 3:
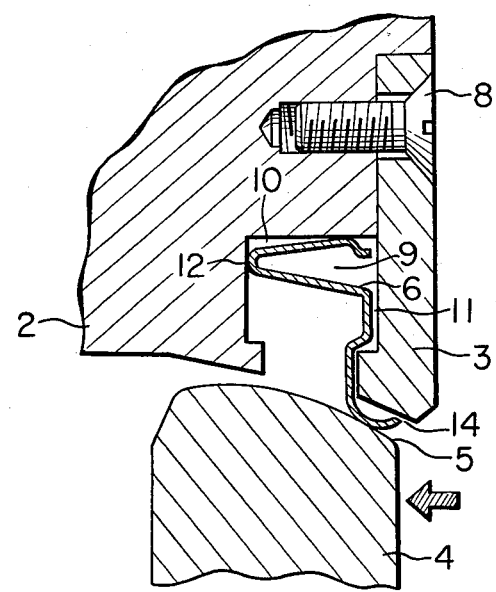
FIGS. 3 and 4 are sectional views of the sealing-device, showing the action of the fire-safe sealing device when the packing seat has been burned off by a fire.

Referring to FIG. 3, when the fluid pressure is applied in the direction shown by the arrow, the fluid pressure passes through the clearances 14 and 11 into the fluid pressure introducing A chamber 9, so that the metallic elastic member 6 is pressed against the inclined seating surface 5 of the inner valve 4 and the side of the nearly T-shaped groove on the valve body side, thereby forming a strong metal-to-metal contact surface which can hold the leakage of fluid to the minimum.

Figure 4:
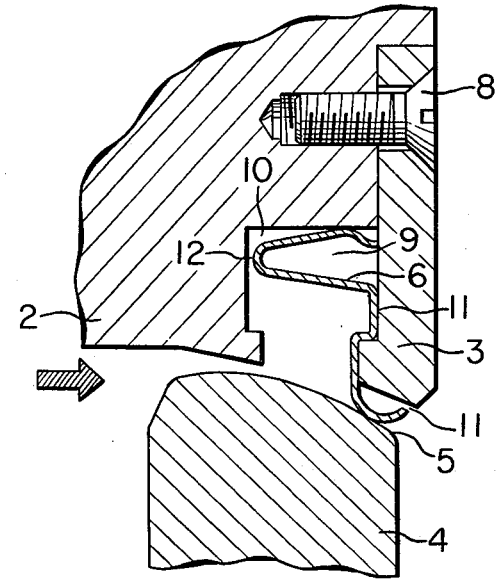

FIG. 4 shows the case where the fluid is passed in the opposite direction. When the fluid pressure is applied to the metallic elastic member 6, it is strongly pressed against the inclined seating surface 5 of the inner valve 4 and the seat packing retainer 3, so that the contact surface having strong metal-to-metal contact is formed in the same manner as described above and the leakage of fluid to the downstream side is held to minimum amount. Particularly, in case of the fluid flowing in this direction, in order to prevent the portion of the metallic elastic member 6 at the fluid passage side having nearly semi-circular shape in section from escaping toward the downstream side along the inclined seating surface 5 it is necessary that the clearance 14 disappears at the time of the fire-safe sealing and said member 6 comes into tight contact with the seat packing retainer 3. In the case where holes or V-shaped recesses are formed to introduce the fluid pressure, the same performance is obtained in the system as shown in FIG. 1 and in the system where the end of the metallic elastic member 6 at the fluid passage side is constantly held in contact with the seat packing retainer 3.

It will be understood that the present invention provides a fire-safe sealing device for valve which has superior features over the conventional device, such as fluid shut-off property, durability, maneuverability or the like in the normal state and also has safety, that is, fire-safe sealing property in the state of fire.

I claim:
1. A fire-safe sealing device for a valve including a valve body defining a fluid passage and an inner valve positioned in said fluid passage to open or close the fluid flow therethrough, which comprises an annular groove having nearly T-shape in section formed around the fluid passage and defined by the valve body; a seat packing retainer attached thereto; a seat packing of synthetic resin mounted in said annular groove and having a portion projecting from the groove into the fluid passage; shoulders formed at the sides of said projecting part to prevent the seat packing from wholly projecting into the fluid passage; an inclined annular surface comprising a bottom surface at the side opposite to the fluid passage; an annular elastic member made of sheet metal arranged to make tight contact with one side and the bottom surfaces of the seat packing and said annular elastic member further comprising an elastic portion of nearly V-shape extending beyond the portion contacting the bottom surface of the seat packing and a contact portion of nearly semi-circular shape in section extending toward the fluid passage side.

* * * * *